United States Patent [19]

Gavin

[11] Patent Number: 5,618,445
[45] Date of Patent: Apr. 8, 1997

[54] SEPTIC TANK SOLIDS RETAINER GAS BAFFLE

[76] Inventor: Norman W. Gavin, 2545 Ridge Rd., North Haven, Conn. 06473

[21] Appl. No.: 504,985

[22] Filed: Jul. 20, 1995

[51] Int. Cl.[6] .................................................. B01D 21/24
[52] U.S. Cl. ......................... 210/800; 210/532.2; 210/540
[58] Field of Search ............................. 210/532.1, 532.2, 210/538, 540, 521, 800

[56] References Cited

U.S. PATENT DOCUMENTS

| 769,584 | 9/1904 | Barber et al. | 210/532.1 |
| 1,115,857 | 11/1914 | Nabstedt | 210/532.2 |
| 1,708,118 | 4/1929 | Carpenter et al. | |
| 2,143,248 | 1/1939 | Otto | 210/6 |
| 2,254,761 | 9/1941 | Swanson | 210/6 |
| 2,911,102 | 11/1959 | Cionchi | 210/532 |
| 2,987,186 | 6/1961 | Burgoon et al. | 210/532.2 |
| 3,239,066 | 3/1966 | Schick | 210/532.1 |
| 3,275,157 | 9/1966 | Stamps | 210/532.2 |
| 3,630,370 | 12/1971 | Quina | 210/170 |
| 3,875,066 | 4/1975 | Lind | 210/521 |
| 4,172,799 | 10/1979 | Perry, Jr. | 210/532 S |
| 4,710,295 | 12/1987 | Zabel | 210/336 |
| 4,832,846 | 5/1989 | Gavin | 210/532.2 |
| 4,886,605 | 12/1989 | Herve | 210/532.2 |

FOREIGN PATENT DOCUMENTS 1036771  8/1958  Germany .

*Primary Examiner*—Christopher Upton
*Attorney, Agent, or Firm*—Robert A. Seemann

[57] ABSTRACT

A downward facing cavity is mounted directly below a vertical outlet pipe in a septic tank to collect particulate matter in the cavity.

9 Claims, 2 Drawing Sheets

SEPTIC TANK SOLIDS RETAINER GAS BAFFLE

BACKGROUND OF THE INVENTION

1. Field of the Invention

The invention pertains to gravitational separators for liquid purification, more specifically to an adaptor for an outlet opening of a septic tank, which diverts gas away from the outlet opening and traps and collects solid particles. The adaptor is small, light weight, and is easy to install in a new septic tank and in an existing septic tank when pumping out the tank.

2. Description of the Prior Art

It is necessary to reduce the percentage of solid particulate matter that is carried to a drain field by way of an outlet opening of a septic tank, as the particulate matter clogs the field and reduces its operational life. It is also necessary to prevent gasses generated by digestion of waste matter in the tank from carrying particulate matter to the opening. Many designs to overcome the two problems have been patented.

Some designs include walls which separate the input side of a tank from the output side and slow flow across the tank so that much of the heavier particulate matter sinks before it can be carried to the exit opening.

For example, U.S. Pat. No. 1,708,118, patented by C. L. Carpenter et al., Apr. 9, 1929 describes baffle plates over the inlet and outlet openings of the tank, and a vertical separator wall which rises from the bottom of the tank and terminates a short distance from the top wall of the tank to form an intervening gas passage above the level of the liquid in the tank.

The wall is spaced from the inlet and outlet openings, and has a relatively small transverse opening spaced from the bottom of the plate, at about the height of the bottoms of the baffles. Most of the digestion occurs on the input side of the separator wall where the heavy sediment settles. The finer sediment and relatively clear liquid passes through the transverse opening for further digestion and settling of another portion of the finer sediment before the liquid leaves through the outlet opening for the field.

Other designs include diverters under the outlet opening. For example, U.S. Pat. No. 2,143,248, patented Jan. 10, 1939 by L. Otto describes two inclined plates, each secured by one of its side edges to the wall of the tank below a vertical, semi-cylindrical conduit to the outlet of the tank. The plates are wider than the radius of the conduit, so that they extend further from the wall than the conduit. The plates are arranged in a Y shape, slightly spaced from one another whereby one passes below and across the bottom of the other, leaving a slit opening between them. Their top edges extend out as far on each side of the opening as the conduit.

The plates thus include a V which directs rising sediment and gasses in a direction that is parallel to the wall and to the right and left of the opening formed at the bottom of the semi-cylindrical conduit and the tank wall. The plates also permit some of the solid particulate matter which may collect on their upward surfaces to pass down through the slit.

This may work well at the start, but after time, the lighter particulate matter which tends to stick to a surface may clog the slit.

U.S. Pat. No. 4,832,846 patented May 23, 1989 by N. Gavin describes a horizontal flat wall diverter that extends inward and downward from the tank wall, just below a vertical, wall-mounted, semi-cylindrical outlet conduit. The flat wall is spaced from the bottom of the tank. The wall extends horizontally beyond the lower opening at the bottom of the conduit, so that the wall deflects rising gas bubbles away from the lower opening of the conduit.

U.S. Pat. No. 3,630,370 patented Dec. 28, 1971 by J. K. Quina, describes a biconic deflector, with its central axis concentric with the axis of the vertical pipe of a tee outlet opening of the septic tank. The biconic deflector is located immediately below the bottom end of the vertical pipe which extends down into the liquid in the tank, held in place below the pipe by holding means inserted into the bottom of the pipe.

The biconic deflector has a top and a bottom apex, each with a cross sectional area that is smaller than that of the bottom end of the pipe and the largest diameter of the deflector is larger than that of the bottom end opening of the pipe.

Gas bubbles resulting from fermentation, which rise in the liquid and carry solid particulate matter, are deflected outward by the lower cone, so that they flow up toward the region around the vertical pipe. The bottom end of the vertical pipe has unencumbered space about its periphery so that gas bubbles carrying solid particles will flow around the pipe and upward rather than dam up against an encumbrance and back up into the pipe.

In lieu of the axially oriented biconic deflector, a corbel, which is an upward and outward stepped projection, is molded on the concrete wall below the bottom end of the pipe. Bubbles flowing over the lower sloped face of the corbel are directed away from the wall and the pipe hanging in front of the wall as they move upward. Bubbles flowing over the top slope of the corbel travel to the unencumbered space around the vertical pipe, and upward.

U.S. Pat. No. 4,172,799, patented Oct. 30, 1979 by Perry, Jr. describes a biconic deflector comprising two conical members joined together at their bases with a suitable adhesive to form a substantially uniform di-cone member having a reinforced center section.

A pair of nylon flexible straps are each attached at one end to bosses just above the joined bases, and attached at their other ends to the bottom of a short coupling tube which closely fits into the inner diameter of the vertical pipe of an outlet tee of the septic tank.

The deflector is mounted on the pipe by inserting the tube upward into the vertical pipe until it stops against an internal rib in the pipe. When mounted on the pipe in the operative position, the biconic deflector is concentric with the central axis of the vertical pipe, spaced just below the lower opening of the pipe. The diameter of the base of the deflector is greater than the lower opening of the vertical pipe.

The flexible mounting provided by the nylon straps permits the conical deflector to be moved aside when a reamer is inserted in the vertical pipe to remove accumulated deposits from the pipe.

A freely movable weight of marble, glass or other suitable material within the biconic deflector assures that the deflector will return to concentricity with the pipe after it has been moved aside for a reaming operation. Holes in the top and bottom ends of the biconic deflector bleed trapped air to make sure that it stays flooded with liquid from the tank and will not float out of operative position.

When liquid enters the septic tank it sets up a flow through the outlet opening of the tank until the liquid in the tank drops back below the outlet opening. This flow, and the rising bubbles carries lighter, particulate matter through the outlet opening unless it is stopped by the deflector.

In general, biconic deflectors deflect gas bubbles reasonably well because the bubbles accelerate upwards past the large diameter base of the deflector upon their natural buoyancy, regardless of the current of liquid flow inward over the top of the biconic deflector into the vertical pipe.

The lighter particulate matter, however, carried solely by the current without upward boost of the bubbles, can be diverted inward over the surface of the upper cone and drawn upward into the vertical pipe of the outlet tee.

The lighter particulate matter may tend to stick to, and build up inside the vertical pipe, or continue on through the outlet opening of the tank and reduce the useful life of the leaching field.

SUMMARY OF THE INVENTION

It is one object of the invention to provide a deflector for the outlet opening of a septic tank, that deflects gas bubbles away from entering the outlet opening.

It is another object of the invention that the deflector deflects light and heavy particulate matter away from entering the exit opening.

It is another object of the invention that the deflector collects light particulate matter and returns it to the bottom of the tank.

It is another object of the invention that useful life of the deflector is not significantly shortened by adherence to the deflector of particulate matter.

It is another object that the deflector can be easily installed in a septic tank when it is new or when it is being cleaned.

It is another object that the deflector can be mounted on a vertical pipe of an unmodified outlet tee.

It is another object that the deflector can be mounted accurately at a predetermined distance from, and concentric with, the vertical pipe of a tee which is partially contaminated internally and externally with particulate matter.

It is another object that the deflector is inexpensive to manufacture, and light in weight.

Other objects and advantages of the invention will become apparent to persons skilled in the art from the ensuing description.

A gas and particulate baffle for an opening of an outlet pipe in a septic tank includes a cup shaped deflector element comprising a cavity, and means for supporting the deflector element in the tank directly below the opening with the cavity facing downward.

The deflector element has a bottom end that is larger than its top end, the cavity being in the bottom end.

In a preferred embodiment, the deflector element is monoconic, and the bottom end of the deflector is round.

In another embodiment, the deflector element is pyramidal.

The means for supporting the deflector element is designed for attaching the deflector element stiffly to the outlet pipe, preferably by attaching to the outer surface of the pipe, and includes means for engaging the bottom of the pipe for spacing the deflector element from the bottom of the pipe.

The means for supporting the deflector element is also designed for holding the deflector element so that the deflector element extends fully over the opening, and for holding the deflector element generally centered with the opening.

A method according to the invention comprises forming an upward depending director element on the floor of the tank directly below the outlet pipe by collecting particulate matter in a downward facing cavity generally centered with, and directly below the outlet pipe in the tank.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

It is to be understood that the phraseology or terminology used herein is for the purpose of description and not of limitation, and that the invention is not limited in its application to only the detail of construction and arrangement of parts illustrated, since the invention is capable of other embodiments and of being practiced or carried out in other ways.

Figure 1:
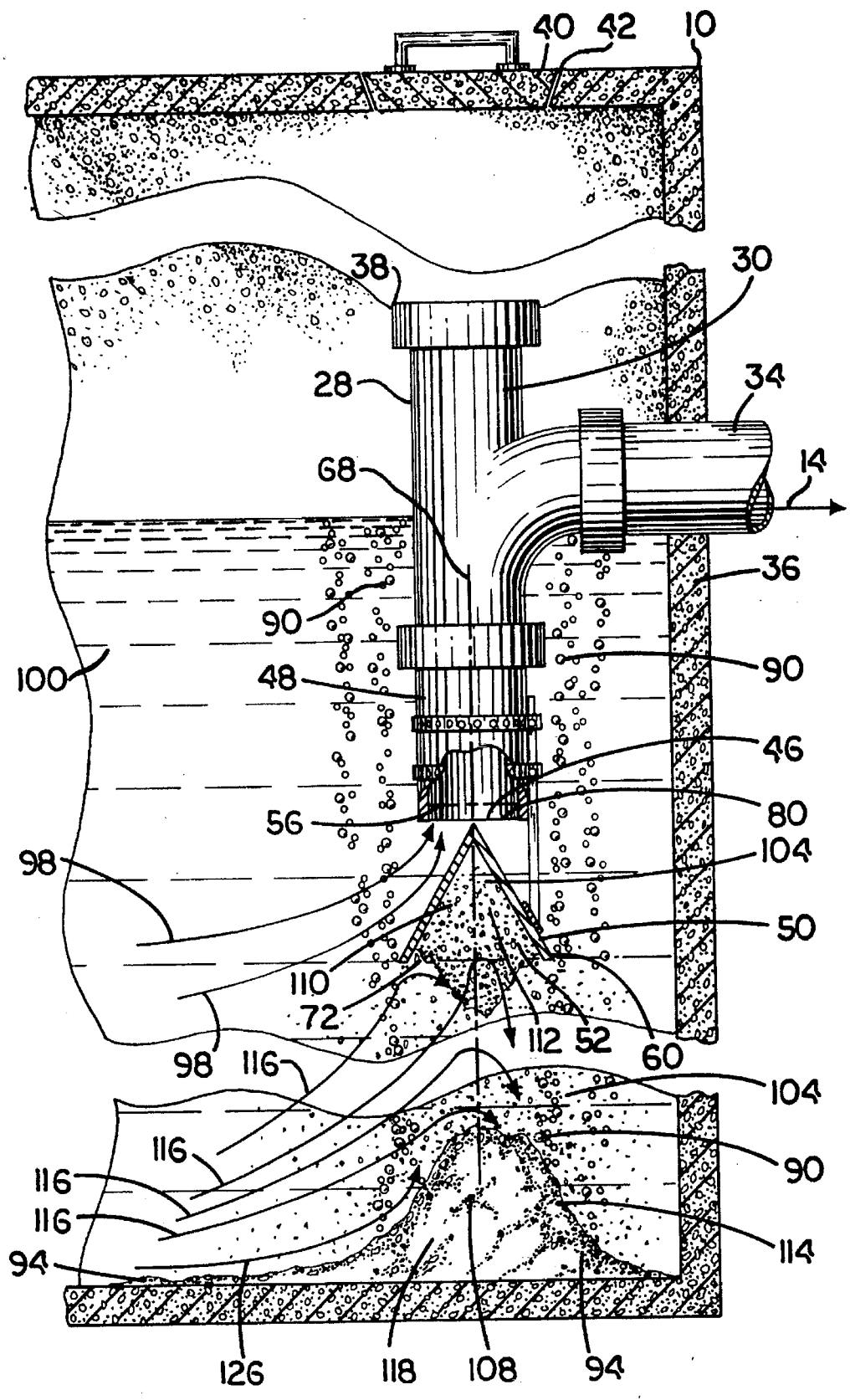
FIG. 1 is a schematic view of a deflector of the invention, mounted on a tee outlet opening of a septic tank. A lower portion of the tee assembly and the deflector are shown in cross section through the axis of the deflector and the vertical pipe of the tee.
Figure 2:
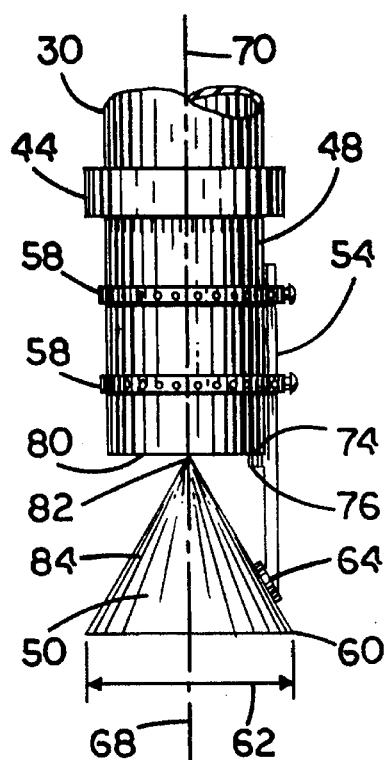
FIG. 2 is a front view of the lower end of the tee and the deflector of FIG. 1.

Referring to FIGS. 1 and 2, septic tank 10 outlet opening 14 comprises tee assembly 28. Tee assembly 28 includes tee 30 connected to pipe 34 through septic tank wall 36. Pipe 34 may be connected to a leeching field according to septic system practice.

The upper end 38 of tee 30 is open so that the tee can be cleaned out by removing tank cover 40 and extending a cleaning tool into the tee.

Attached in a standard manner to the lower end 44 of the tee is a section of unmodified pipe 48 such as standard 4" PVC pipe.

Deflector 50, has a downward facing cavity 52 formed in the shape of a cone. Deflector 50 is attached by arm 54 to pipe 48 by a pair of plastic, wide profile, tie wrap strips 58, with the large diameter end 60 of the deflector facing downward.

The diameter 62 of large diameter end 60 of the deflector is larger than diameter 56 of opening 46 of bottom edge 80 of pipe 48. For example in one embodiment having the deflector mounted on a standard 4" PVC pipe, diameter 62 is such that the deflector extends laterally more than 2" in all directions beyond the outside of the pipe.

Arm 54 is fastened to deflector 50 by bracket 64, so that when arm 54 is attached to pipe 48 with arm 54 being vertical, axis 68 of deflector 50 is generally concentric with axis 70 of pipe 48. In the installation of deflector 50 on pipe 48, arm 54 is slid upward until surface 74 of inwardly oriented extension 76 is resting against bottom edge 80 of pipe 48. This assures that apex 82 of sloped wall 84 of deflector 50 is close to bottom edge 80 of pipe 48, without sealing off the pipe. Preferably apex 82 is level with bottom edge 80.

The above mounting system for the deflector on tee assembly 28 provides accurate and easy mounting of the deflector on a pipe 48. Surface 74 of extension 76, and tie wrap strips 58 correct for layers of solid particulate matter that may be stuck to pipe 48. The deflector may be mounted in a new installation of a septic tank, or may be mounted during a clean out process of tank 10 by removing cover 40, inserting the deflector with attached arm 54 through opening 42, and strapping it on the pipe.

The mounting system for the deflector is preferably one that holds the deflector stiffly in position with respect to the pipe.

The mounting system may be attached to the deflector by brackets, fasteners, bonding, or the like, or may be molded as one piece with the deflector.

In operation in the tank, bubbles 90 rising from digesting organic matter 94 pass around downward facing larger diameter end 60 and upward outside of bottom edge 80 of pipe 48. The rising bubbles and flow currents 98 of liquid 100 in the tank carry light particulate matter 104 and heavy particulate matter 108 upward 116 toward deflector 50.

If the deflector were a biconic deflector, the light and heavy particulate matter would flow upward over the lower cone. Some of the heavy and much of the light would continue over the upper cone into pipe 48. The rest of the heavy and light would be directed by the lower cone away from the axis of the biconic deflector and would fall a lateral distance from below the deflector.

In the invention, however, the light particulate matter is captured by downward facing opening 72 of cavity 52 of deflector 50. The deflector is preferably closed but for downward facing opening 72.

Much of the light particulate matter sticks to the inside of the downward facing cavity and builds up upon itself. The gathering particulate matter forms dynamic element 110 which dynamically grows and changes. Due to the adhesive and cohesive clodding quality of the particulate matter, and influence of liquid currents and the bubbles, dynamic element 110 forms into a downward depending mound 112, portions of which periodically drop from the cavity and fall to the bottom of the tank under the deflector.

Heavy particulate matter which rises 116 to the deflector mostly does not stick, but falls 116 down under the deflector. Mound 114 formed of light particulate matter from element 110, and heavy particulate matter which is deflected downward by the cavity and element 110, forms upward depending director element 118 which is generally centered upon axis 68.

Director element 118 continues to be digested so long as it contains undigested organic matter. Director element provides a localized flow of bubbles directly upward toward cavity 52 which impinge on element 110 helping to break away portions, and delivers additional light particulate matter to cavity 52.

Upwardly depending director element 118 also guides lateral flow of liquid upward 126 toward deflector 50.

When tank 10 is pumped down and liquid falls below deflector 50, part or most of dynamic element 110 drops from the cavity.

Dynamic element 110 can also be partially knocked from the cavity by tapping the deflector with a pipe cleaning tool inserted in top 38 of the tee. This will cause the stiffly mounted deflector to vibrate and shake accumulated particulate matter loose.

Figure 3:
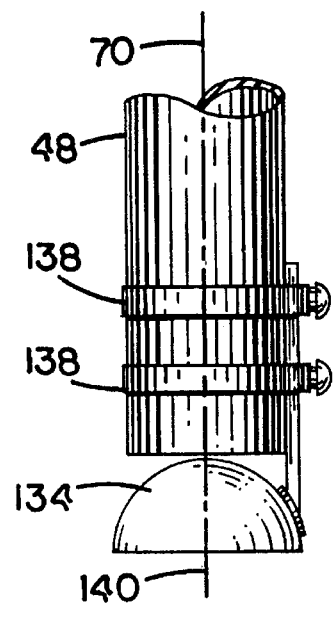
FIG. 3 is a front view of the lower end of a tee and another deflector according to the invention.
Figure 4:
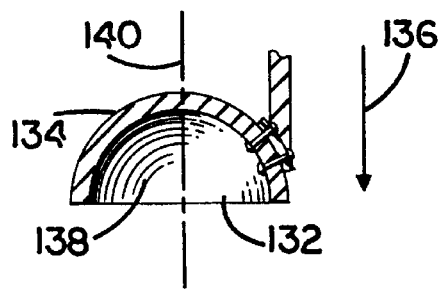
FIG. 4 is a cross section view of the deflector of FIG. 3.

Referring to FIGS. 3 and 4, round shell deflector 134 is mounted on pipe 48 by plastic latching straps 138. The mounting straps are preferably ones which can be drawn tight and locked with one hand.

Shell deflector 134 has a downward 136 facing cavity 138. Cavity opening 132 is in the form of one half of an ellipse elongated on vertical axis 140. Axis 140 generally coincides with axis 70 of pipe 48.

The cavity is preferably formed by a continuous smooth wall, but a cavity formed by a plurality of angled walls may be used. The deflector or shell may also have angled walls. For example it may be pyramidal and may contain a pyramidal or round cavity.

Figure 5:
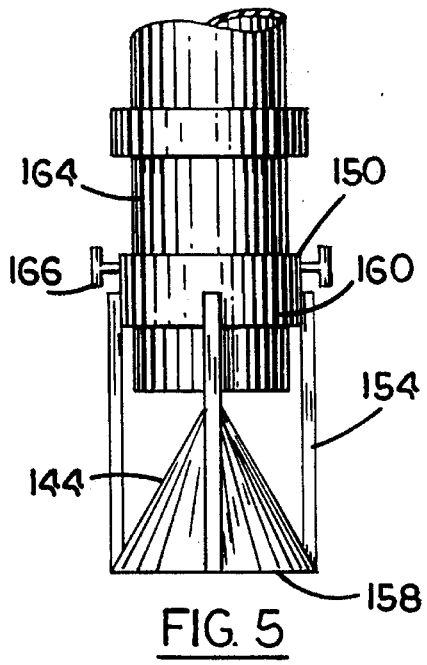
FIG. 5 is a front view of the lower end of a tee and another deflector according to the invention.
Figure 6:
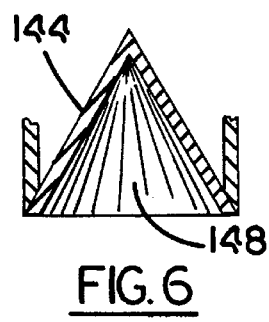
FIG. 6 is a cross section view of the deflector of FIG. 5.

In FIGS. 5 and 6, pyramidal deflector 144 has downward facing pyramidal cavity 148. Mounting assembly 150 is designed for mounting on a standard pipe of known diameter. Assembly 150 includes rigid frame 154 attached at one end to base 158 of the deflector shell, and at the other end to collar 160. Collar 160 is tightened on pipe 164 by wing screws 166 or other fasteners.

Although the invention has been described in terms of specific preferred embodiments, it will be obvious to one skilled in the art that various modifications and substitutions are contemplated by the invention disclosed herein and that all such modifications and substitutions are included within the scope of the invention as defined in the appended claims.

I claim:

1. In a septic tank comprising a planar bottom, a gas and particulate matter baffle comprising:

a vertical outlet pipe being open at the bottom of the pipe, a cup having a closed top, a cavity, an open bottom continuous with the cavity, and a wall of said cup enclosing the cavity and connecting the closed top to the open bottom of the cup, said open bottom of the cup having a larger area than the closed top, support means connected to said vertical pipe for supporting the bottom of the cup directly below the pipe opening with said cavity facing downward toward the planar bottom under the pipe.

2. The baffle of claim 1, further comprising:

the bottom of said cup being a circle and the top of the cup being spaced from the walls of the tank.

3. The baffle of claim 1, further comprising:

said wall of said cup being mono-conic.

4. The baffle of claim 1, further comprising:

said wall of said cup being pyramidal.

5. The baffle of claim 1, further comprising: said vertical pipe having an axis, the bottom of said vertical pipe being normal to said axis, said wall of said cup forming an apex at the top of the cup, said support means being attached to said pipe so that said apex is concentric with said axis and adjacent to the bottom of said pipe.

6. The baffle of claim 5, further comprising:

said bottom of said cup being below said bottom of said vertical pipe, being sufficiently large to cover the opening of said pipe, said opening of said pipe extending upward in constant diameter.

7. The baffle of claim 1, further comprising:

said vertical pipe having an axis, said cup having an apex at the top of said cup, said support means holding said cup so that the cup extends fully over the pipe opening, said cup being a single cup having an apex on said axis below the pipe.

8. In a septic tank, the method for reducing the amount of particulate matter entering an outlet pipe in the tank, and thereby exiting the tank for a leaching field, the method comprising:

collecting the particulate matter in a downward facing cavity of a cup having a wall enclosing the top and sides of the cavity and a bottom open to the cavity, that is held directly below the downward facing opening of vertically upward extending constant diameter of said outlet pipe in said tank over a generally horizontally planar floor area of the septic tank that is larger than the open bottom of the cup.

9. The method of claim 8 further comprising:

forming an upward depending conical director element on the planar floor of the tank concentrically with and directly below the outlet pipe opening which is completely covered below the outlet pipe opening by the cup.

* * * * *